(12) United States Patent
Endo

(10) Patent No.: US 11,222,665 B2
(45) Date of Patent: Jan. 11, 2022

(54) SERVO WRITER AND SERVO SIGNAL WRITING METHOD

(71) Applicant: Sony Corporation, Tokyo (JP)

(72) Inventor: Tetsuo Endo, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/762,776

(22) PCT Filed: Nov. 9, 2018

(86) PCT No.: PCT/JP2018/041638
§ 371 (c)(1),
(2) Date: May 8, 2020

(87) PCT Pub. No.: WO2019/093467
PCT Pub. Date: May 16, 2019

(65) Prior Publication Data
US 2020/0365184 A1    Nov. 19, 2020

(30) Foreign Application Priority Data

Nov. 9, 2017    (JP) .............................. JP2017-216637

(51) Int. Cl.
*G11B 5/588*    (2006.01)
*G11B 21/10*    (2006.01)
(Continued)

(52) U.S. Cl.
CPC ........ *G11B 21/103* (2013.01); *G11B 5/00813* (2013.01); *G11B 5/584* (2013.01); *G11B 15/60* (2013.01); *G11B 5/588* (2013.01)

(58) Field of Classification Search
USPC ............. 360/27–77.01, 77.12–78.03, 83–85, 360/90–96.61
See application file for complete search history.

(56) References Cited

U.S. PATENT DOCUMENTS

| | | | |
|---|---|---|---|
| 6,994,293 B1 | 2/2006 | Coburn | |
| 7,826,165 B2 * | 11/2010 | Kawakami | G11B 5/584 360/75 |

(Continued)

FOREIGN PATENT DOCUMENTS

| | | |
|---|---|---|
| JP | 2003-085850 | 3/2003 |
| JP | 2003-085850 A | 3/2003 |

(Continued)

OTHER PUBLICATIONS

International Search Report issued in connection with PCT/JP2018/041638, dated Jan. 15, 2019.

*Primary Examiner* — Tan X Dinh
(74) *Attorney, Agent, or Firm* — K&L Gates LLP

(57) ABSTRACT

A servo writer includes a writing head that writes a servo signal on a long magnetic tape that is traveling and at least two first guide rollers that guide the travel of the magnetic tape, in which the at least two first guide rollers on which a spiral groove is provided have a circumferential surface that has contact with the traveling magnetic tape, tensile forces act on the magnetic tape from the at least two first guide rollers in a width direction of the traveling magnetic tape, and the tensile forces that act on the magnetic tape from the at least two first guide rollers cancel each other.

11 Claims, 12 Drawing Sheets

(51) Int. Cl.
*G11B 5/008* (2006.01)
*G11B 5/584* (2006.01)
*G11B 15/60* (2006.01)

(56) References Cited

U.S. PATENT DOCUMENTS

| | | | |
|---|---|---|---|
| 8,068,308 B2* | 11/2011 | Fujita | G11B 5/584 |
| | | | 360/77.12 |
| 11,011,205 B2* | 5/2021 | Endo | G11B 15/60 |
| 2003/0048583 A1* | 3/2003 | Tanaka | G11B 15/602 |
| | | | 360/130.21 |
| 2006/0256465 A1* | 11/2006 | Biskeborn | G11B 15/60 |
| | | | 360/71 |
| 2007/0285840 A1* | 12/2007 | Kitamura | G11B 15/60 |
| | | | 360/134 |
| 2012/0050909 A1* | 3/2012 | Lantz | G11B 15/602 |
| | | | 360/71 |
| 2012/0298786 A1* | 11/2012 | Izumida | B65H 23/038 |
| | | | 242/534 |
| 2014/0029131 A1* | 1/2014 | Engelen | G11B 15/602 |
| | | | 360/71 |
| 2014/0029134 A1* | 1/2014 | Engelen | G11B 15/00 |
| | | | 360/82 |
| 2020/0075051 A1* | 3/2020 | Tachibana | G11B 5/7363 |

FOREIGN PATENT DOCUMENTS

| | | |
|---|---|---|
| JP | 200007-287237 | 11/2007 |
| JP | 2009-043392 | 2/2009 |
| JP | 2009-043392 A | 2/2009 |
| JP | 2012-038419 | 2/2012 |
| JP | 2012-038419 A | 2/2012 |

* cited by examiner

SERVO WRITER AND SERVO SIGNAL WRITING METHOD

TECHNICAL FIELD

The present disclosure relates to a servo writer and a servo signal writing method.

BACKGROUND ART

In recent years, in a magnetic tape used as a data storage for a computer, a data track width and an interval between adjacent data tracks are extremely narrow in order to improve data recording density. If the data track width and the interval between the adjacent data tracks are narrowed in this way, it is difficult to trace the data track by a recording/reproducing element of a magnetic head.

Therefore, a technology has been proposed that performs servo control on a position of the recording/reproducing element of the magnetic tape in the width direction of the magnetic tape by writing a servo signal on a magnetic tape in advance and reading the servo signal by the magnetic head.

Patent Document 1 proposes a servo writer that includes a guide roller for guiding a traveling magnetic tape and in which a concave groove is formed around an axis of a roller body on a circumferential surface of the roller body of the guide roller. Furthermore, Patent Document 1 describes that the following effects can be obtained. That is, in the servo writer, since the traveling magnetic tape is moved to one side on the circumferential surface of the roller body, an edge of the magnetic tape slides on the flange of the roller body, and a traveling position of the magnetic tape is regulated. With this structure, it is possible to stably travel the magnetic tape.

CITATION LIST

Patent Document

Patent Document 1: Japanese Patent Application Laid-Open No. 2007-287237

SUMMARY OF THE INVENTION

Problems to be Solved by the Invention

However, if the edge of the magnetic tape is deformed, the edge of the magnetic tape irregularly has contact with a flange, and there is a possibility that vibration caused by the contact adversely affects servo pattern writing accuracy. In particular, there is a possibility that, in a high recording density magnetic tape, the servo pattern writing accuracy is adversely affected. Therefore, a servo writer is desired which can stably travel the magnetic tape even in a case where the edge of the magnetic tape is deformed.

An object of the present disclosure is to provide a servo writer that can stably travel a magnetic tape and a servo signal writing method.

Solutions to Problems

To solve the above problems, a first disclosure is a servo writer that includes a writing head that writes a servo signal on a long magnetic tape that is traveling and at least two first guide rollers that guide the travel of the magnetic tape, in which the at least two first guide rollers on which a spiral groove is provided have a circumferential surface that has contact with the traveling magnetic tape, tensile forces act on the magnetic tape from the at least two first guide rollers in a width direction of the traveling magnetic tape, and the tensile forces that act on the magnetic tape from the at least two first guide rollers cancel each other.

A second disclosure is a servo signal writing method that includes writing a servo signal on a magnetic tape while guiding the traveling magnetic tape by at least two guide rollers, in which the at least two guide rollers on which a spiral groove is provided have a circumferential surface that has contact with the traveling magnetic tape, tensile forces act on the magnetic tape from the at least two guide rollers in a width direction of the traveling magnetic tape, and the tensile forces that act on the magnetic tape from the at least two guide rollers cancel each other.

Effects of the Invention

According to the present disclosure, it is possible to stably travel a magnetic tape. Note that the effects described herein are not necessarily limited and that the effect may be any effects described in the present disclosure or an effect different from the above effects.

MODE FOR CARRYING OUT THE INVENTION

Embodiments of the present disclosure will be described in the following order.
1 First Embodiment (Example of Servo Writer)
2 Second Embodiment (Example of Servo Writer)
3 Third Embodiment (Example of Servo Writer)

1 First Embodiment

[Configuration of Servo Writer]

Figure 1:
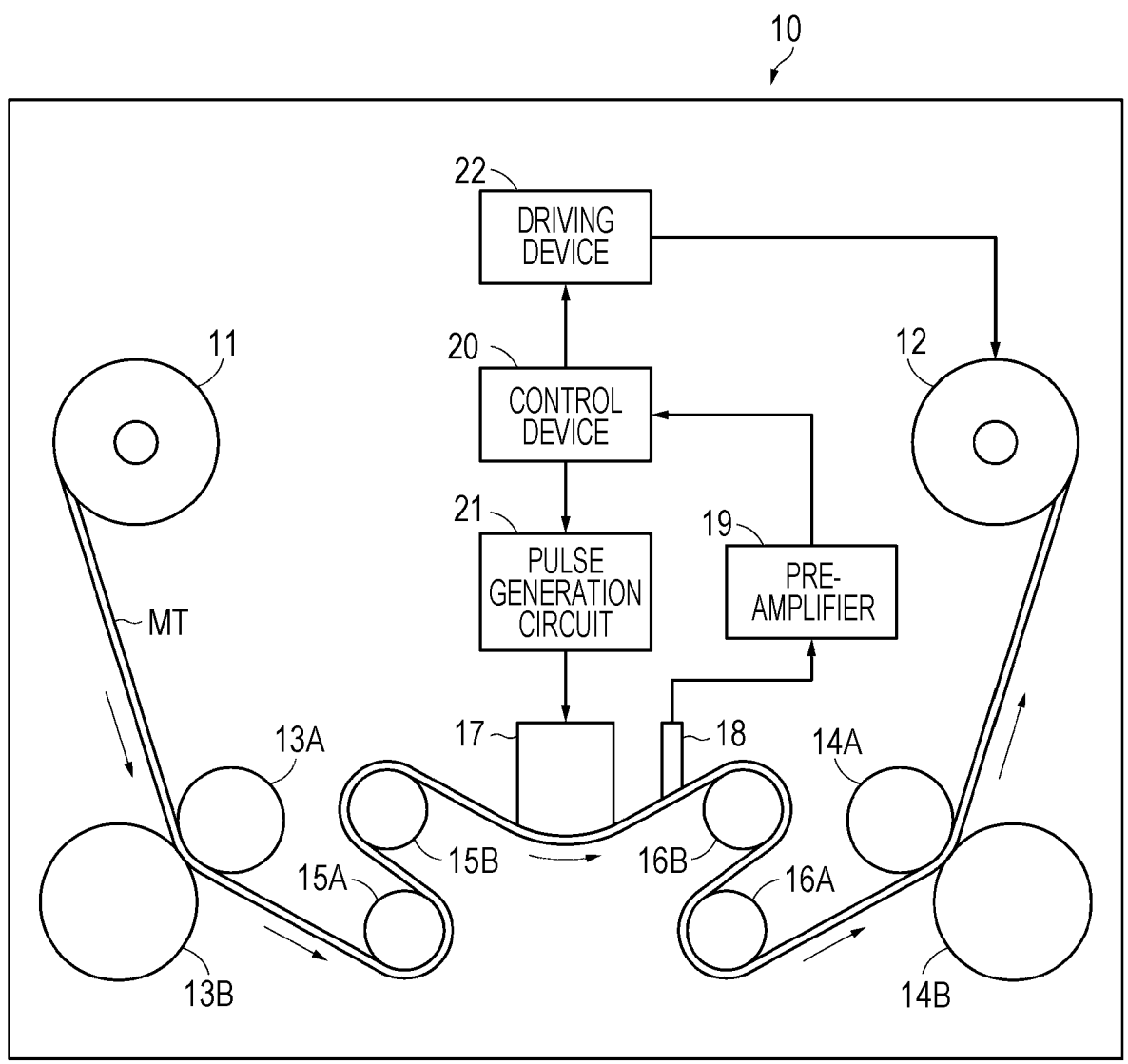
FIG. 1 is a schematic diagram illustrating a configuration of a servo writer according to a first embodiment.

As illustrated in FIG. 1, a servo writer 10 according to a first embodiment includes a delivery reel 11, a winding reel 12, capstans 13A and 14A, pinch rollers 13B and 14B, guide rollers 15A, 15B, 16A, and 16B, a servo signal writing head 17, a servo signal reading head 18, a pre-amplifier 19, a control device 20, a pulse generation circuit 21, and a driving device 22. The servo writer 10 is a magnetic tape device that writes a servo signal on a servo band of a long magnetic tape MT.

(Delivery and Winding Reels)

The delivery reel 11 sends the magnetic tape MT on which the servo signal is written. The winding reel 12 winds up the magnetic tape MT on which the servo signal has been written.

(Capstan and Pinch Roller)

The capstan 13A and the pinch roller 13B are provided on an upstream side of a travel path of the magnetic tape MT (hereinafter, simply referred to as "travel path") with respect to the servo signal writing head 17. More specifically, the capstan 13A and the pinch roller 13B are provided in the travel path between the delivery reel 11 and the servo signal writing head 17. Here, the upstream side and the downstream side respectively mean an upstream side and a downstream side in a traveling direction of the magnetic tape MT. The capstan 13A and the pinch roller 13B sandwich the magnetic tape MT sent from the delivery reel 11 and make the magnetic tape MT travel at a constant speed.

The capstan 14A and the pinch roller 14B are provided on the downstream side of the travel path with respect to the servo signal writing head 17. More specifically, the capstan 14A and the pinch roller 14B are provided in the travel path between the winding reel 12 and the servo signal writing head 17. The capstan 14A and the pinch roller 14B sandwich the magnetic tape MT on which the servo signal has been written and make the magnetic tape MT travel at a constant speed.

(Guide Roller)

The guide rollers 15A and 15B are provided on the upstream side of the travel path with respect to the servo signal writing head 17. More specifically, the guide rollers 15A and 15B are provided in the travel path between the capstan 13A and the pinch roller 13B and the servo signal writing head 17. The guide roller 15A is provided on the upstream side of the travel path with respect to the guide roller 15B.

The guide rollers 15A and 15B freely rotate around the axis and guide the magnetic tape MT that travels from the capstan 13A and the pinch roller 13B toward the servo signal writing head 17. The guide roller 15A has contact with a recording surface (first surface), on which the servo signal writing head 17 slides, of both main surfaces of the magnetic tape MT and guides the travel of the magnetic tape MT. On the other hand, the guide roller 15B has contact with a rear surface (second surface) opposite to the recording surface of both main surfaces of the magnetic tape MT and guides the travel of the magnetic tape MT. Furthermore, the guide rollers 15A and 15B rotate in reverse directions as viewed from the side of one end of each of the guide rollers 15A and 15B.

The guide rollers 16A and 16B are provided on the downstream side of the travel path with respect to the servo signal writing head 17. More specifically, the guide rollers 16A and 16B are provided in the travel path between the servo signal writing head 17 and the capstan 14A and the pinch roller 14B. The guide roller 16A is provided on the downstream side of the travel path with respect to the guide roller 16B.

The guide rollers 16A and 16B freely rotate around the axis and guide the magnetic tape MT that travels from the servo signal writing head 17 toward the capstan 14A and the pinch roller 14B. The guide roller 16A has contact with the recording surface of the magnetic tape MT and guides the travel of the magnetic tape MT. On the other hand, the guide roller 16B has contact with the rear surface of the magnetic tape MT and guides the travel of the magnetic tape MT. Furthermore, the guide rollers 16A and 16B rotate in reverse directions as viewed from the side of one end of each of the guide rollers 16A and 16B.

Figure 2:
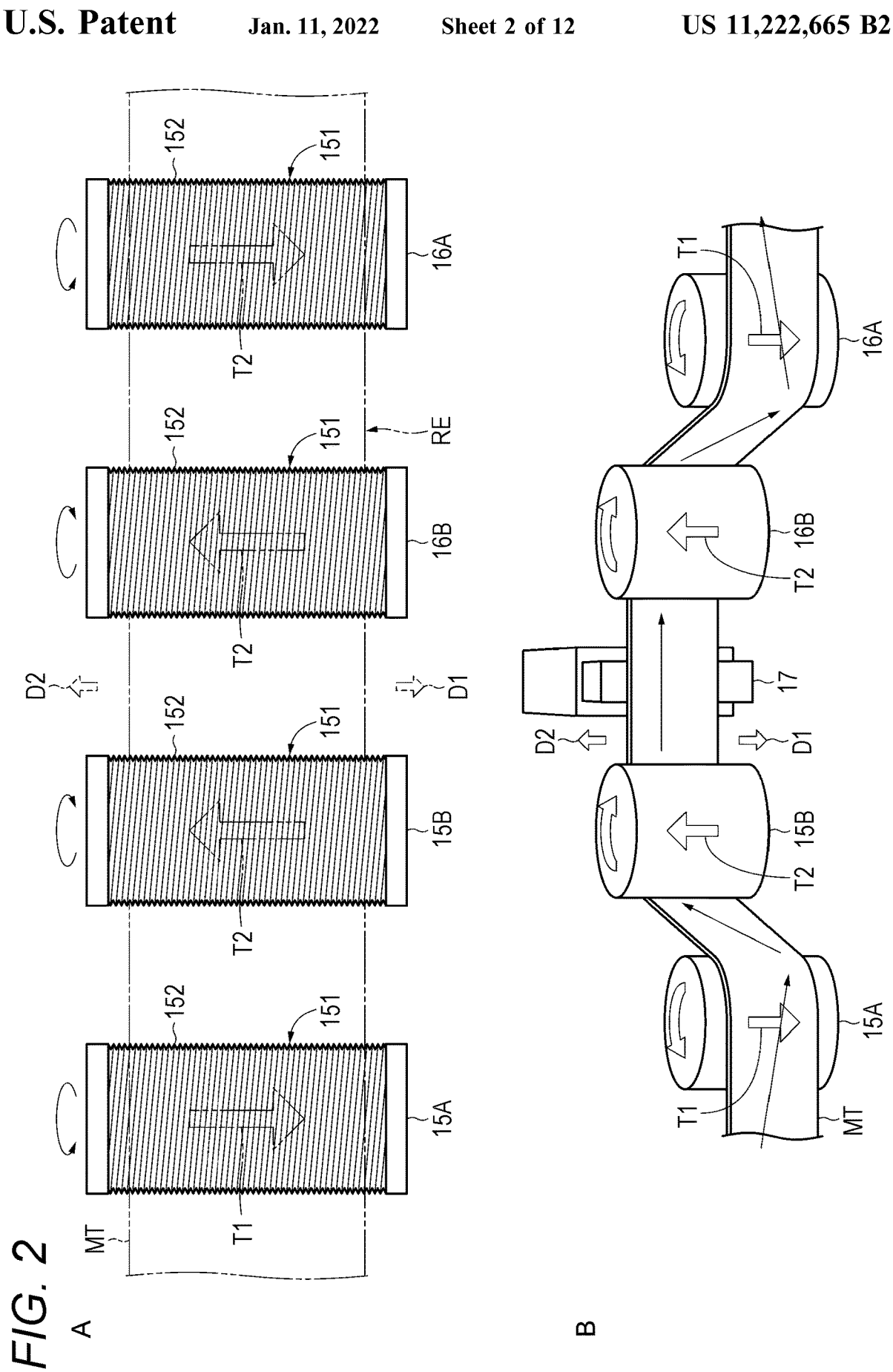
FIG. 2A is a plan view illustrating a configuration of a guide roller.
FIG. 2B is a perspective view illustrating a direction of a tensile force that acts on a traveling magnetic tape from the guide roller.

As illustrated in FIG. 2A, each of the guide rollers 15A and 15B has a circumferential surface 151 that has contact with the traveling magnetic tape MT. In the circumferential surface 151, a spiral groove 152 is provided with rotation axes of the guide rollers 15A and 15B as a central axis. The directions of the spirals of the grooves 152 of the respective guide rollers 15A and 15B are the same as viewed from the side of the one end of each of the guide rollers 15A and 15B.

By providing the spiral groove 152 in the circumferential surface 151 as described above, as illustrated in FIG. 2B, tensile forces T1 and T2 act on the magnetic tape MT from the guide rollers 15A and 15B in a width direction of the traveling magnetic tape. More specifically, the tensile force T1 acts on the magnetic tape MT from the guide roller 15A in a first width direction of the traveling magnetic tape MT. On the other hand, the tensile force T2 acts on the magnetic tape MT from the guide roller 15B in a second width direction (direction opposite to tensile force T1) of the traveling magnetic tape MT. The magnitudes of the tensile force T1 that acts in the first width direction and the tensile force T2 that acts in the second width direction are equal to each other or substantially equal to each other. That is, the tensile forces T1 and T2 that act on the magnetic tape MT respectively from the guide rollers 15A and 15B cancel each other. As described above, a traveling position of the magnetic tape MT is regulated by the tensile forces T1 and T2 that reversely act in the width direction of the magnetic tape MT. Therefore, it is possible to stably travel the magnetic tape MT. It is preferable to regulate the traveling position so that the magnetic tape MT travels substantially at the center of the peripheral surfaces of the guide rollers 15A and 15B.

Note that, in actual, the tensile force oblique to the traveling direction of the magnetic tape MT acts on the magnetic tape MT from the guide rollers 15A and 15B. However, here, description will be made as focusing on a component of the tensile force acting in the width direction of the traveling magnetic tape MT from among the above tensile forces.

The guide rollers 15A and 15B are guide rollers in which flanges are not provided on both ends of the circumferential surface 151 (that is, flangeless guide roller). Since the guide rollers 15A and 15B are flangeless guide rollers, even in a case where the magnetic tape MT shifts from the center to one side of the peripheral surfaces of the guide rollers 15A and 15B, the edge of the magnetic tape MT irregularly has contact with the flange, and the contact does not cause the vibration of the magnetic tape MT. Therefore, servo signal writing accuracy can be improved.

Since the configurations of the guide rollers 16A and 16B are similar to those of the guide rollers 15A and 15B, description thereof will be omitted.

In the travel path between the capstan 13A and the pinch roller 13B and the servo signal writing head 17, it is preferable that the magnetic tape MT be wound around the guide rollers 15A and 15B in an S-like shape. Since the tensile forces T1 and T2 that act on the magnetic tape MT respectively from the guide rollers 15A and 15B can be increased, the traveling position of the magnetic tape MT can be more reliably regulated. Therefore, traveling stability of the magnetic tape MT is further improved.

In the travel path between the capstan 14A and the pinch roller 14B and the servo signal writing head 17, it is preferable that the magnetic tape MT be wound around the guide rollers 16A and 16B in an inverted S-like shape. Since the tensile forces T1 and T2 that act on the magnetic tape MT respectively from the guide rollers 16A and 16B can be increased, the traveling position of the magnetic tape MT can be more reliably regulated. Therefore, traveling stability of the magnetic tape MT is further improved.

(Servo Signal Writing Head)

The servo signal writing head 17 is provided in the travel path between the guide rollers 15B and 16B. The servo signal writing head 17 is a magnetic head that writes a servo signal on the servo band of the traveling magnetic tape MT. As the servo signal writing head 17, for example, the one described in JP 2006-127730 A can be used.

The servo signal writing head 17 includes a sliding surface that slides on the magnetic tape MT, and a plurality of recording elements and at least one bottomed cavity (recess) are provided on the sliding surface. The recording element has a magnetic gap. The plurality of magnetic gaps is arranged in a row at predetermined intervals on the sliding surface so as to correspond to the position of each servo band in the width direction of the magnetic tape MT.

The periphery of the bottomed cavity is closed, and the bottomed cavity is formed only within a traveling region width of the magnetic tape MT. By providing the bottomed cavity having such a configuration on the sliding surface, expansion of air between the sliding surface and the magnetic tape MT is facilitated at the time when the magnetic tape MT travels, and decrease in air pressure, that is, a negative pressure further reduces spacing and improves the traveling stability of the magnetic tape MT.

(Servo Signal Reading Head)

The servo signal reading head 18 is provided on the downstream side of the travel path with respect to the servo signal writing head 17. More specifically, the servo signal reading head 18 is provided in the travel path between the servo signal writing head 17 and the guide roller 16B.

The servo signal reading head 18 is a magnetic head that slides on the magnetic tape MT on which the servo signal is written and reads the servo signal written on the servo band. The servo signal reading head 18 is similar to the servo signal writing head 17 other than a point, for example, that a plurality of reproducing elements is included instead of the plurality of recording elements.

(Pre-Amplifier)

The pre-amplifier 19 amplifies the servo signal read by the servo signal reading head 18 and supplies the amplified signal to the control device 20.

(Control Device)

The control device 20 is a device that controls an operation of each unit of the servo writer 10 and includes a central processing unit (CPU), various storage devices, or the like. The control device 20 generates a pulse control signal which is used to control a current value, a pulse width, and a generation timing of a recording pulse current so that the servo signal written on the magnetic tape MT by the servo signal writing head 17 has a predetermined servo pattern and supplies the generated signal to the pulse generation circuit 21.

The control device 20 sets a current value of the recording pulse current so that an output value of the servo signal is substantially constant (within predetermined range) on the basis of the servo signal supplied from the servo signal reading head 18 via the pre-amplifier 19 and supplies the signal to the pulse generation circuit 21. That is, the control device 20 controls the recording pulse current on the basis of the output value of the servo signal read by the servo signal reading head 18.

To set the traveling speed of the magnetic tape MT when the servo signal is written to be constant, the control device 20 generates a motor current signal used to control a motor current of the driving device 22 and supplies the signal to the driving device 22.

(Pulse Generation Circuit)

The pulse generation circuit 21 generates a recording pulse current on the basis of the pulse control signal supplied from the control device 20 and supplies the current to the servo signal writing head 17.

(Driving Device)

The driving device 22 is a device that rotates and drives the winding reel 12 and includes a motor, a motor driving circuit used to supply a current to the motor, a gear that couples a motor shaft and the winding reel 12, or the like. The driving device 22 generates the motor current by the motor driving circuit on the basis of the motor current signal from the control device 20 and supplies the motor current to the motor so as to transmit a rotation driving force of the motor to the winding reel 12 via the gear and rotate and drive the winding reel 12.

[Servo Signal Writing Method]

A servo signal writing method by using the servo writer 10 will be described below.

First, as illustrated in FIG. 1, a pancake-like magnetic tape MT is set as the delivery reel 11 of the servo writer 10, and a front end of the magnetic tape MT is pulled out. The front end of the magnetic tape MT is coupled to a winding core of the winding reel 12 via the capstan 13A, the pinch roller 13B, the guide rollers 15A, 15B, 16A, and 16B, the capstan 14A, and the pinch roller 14B.

Next, by rotating and driving the winding reel 12 by the driving device 22 and making the winding reel 12 wind the magnetic tape MT, the magnetic tape MT travels from the delivery reel 11 toward the winding reel 12. Then, while guiding the traveling magnetic tape MT by the guide rollers 15A, 15B, 16A, and 16B, the servo signal is written on the magnetic tape MT by the servo signal writing head 17. Note that the magnetic tape MT on which the servo signal has been written is wound by the winding reel 12. Thereafter, the magnetic tape MT is cut into a piece having a tape length depending on specifications of a product and is housed in a cartridge case or the like.

When the magnetic tape MT travels, as illustrated in FIGS. 2A and 2B, the tensile force T1 acts on the magnetic tape MT from the guide roller 15A in the first width direction of the traveling magnetic tape MT, and the tensile force T2 acts on the magnetic tape MT from the guide roller 15B in the second width direction of the traveling magnetic tape MT. The traveling position of the magnetic tape MT is regulated at predetermined positions (for example, center position) of the guide rollers 15A and 15B by the tensile forces T1 and T2 that act in the directions opposite to each other. Therefore, it is possible to stably travel the magnetic tape MT on the upstream side of the travel path with respect to the servo signal writing head 17.

Furthermore, as illustrated in FIGS. 2A and 2B, the tensile force T2 acts on the magnetic tape MT from the guide roller 16B in the second width direction of the traveling magnetic tape MT, and the tensile force T1 acts on the magnetic tape MT from the guide roller 16A in the first width direction of the traveling magnetic tape MT. The traveling position of the magnetic tape MT is regulated at predetermined positions (for example, center position) of the guide rollers 16A and 16B by the tensile forces T1 and T2 that act in the directions opposite to each other. Therefore, it is possible to stably travel the magnetic tape MT on the downstream side of the travel path with respect to the servo signal writing head 17.

[Effect]

The servo writer 10 according to the first embodiment includes the guide rollers 15A, 15B, 16A, and 16B that guide the travel of the magnetic tape MT. The spiral groove 152 is provided in each of the guide rollers 15A, 15B, 16A, and 16B, and each of the guide rollers 15A, 15B, 16A, and 16B includes the circumferential surface 151 having contact with the traveling magnetic tape MT. The tensile forces T1 and T2 act on the magnetic tape MT from the guide rollers 15A, 15B, 16A, and 16B in the width direction of the traveling magnetic tape MT. The tensile forces T1 and T2 acting on the magnetic tape MT from the guide rollers 15A, 15B, 16A, and 16B are forces in opposite directions and cancel each other. With this structure, it is possible to regulate the traveling position of the magnetic tape MT by the tensile forces T1 and T2 and stably travel the magnetic tape MT. Therefore, even in a case where an edge of the magnetic tape MT is deformed, it is possible to stably travel the magnetic tape MT.

Furthermore, since the guide rollers 15A and 15B are flangeless guide rollers, even in a case where the magnetic tape MT shifts from the center to one side of the peripheral surfaces of the guide rollers 15A and 15B, a case does not occur in which the edge of the magnetic tape MT irregularly has contact with the flange and the contact causes the vibration of the magnetic tape MT. Therefore, servo signal writing accuracy can be improved.

Figure 3:
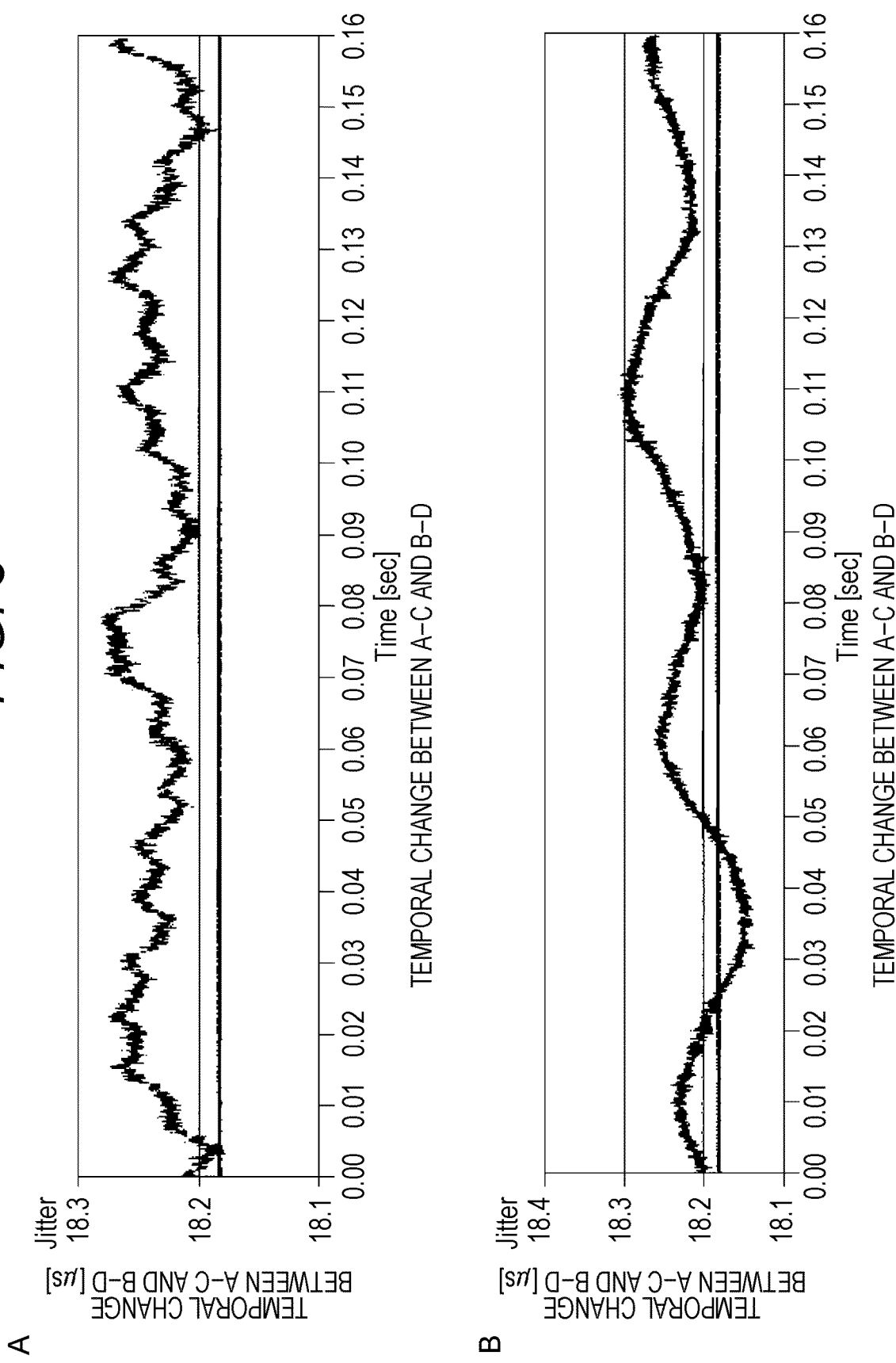
FIG. 3A is a diagram illustrating tape speed information of a general servo writer.
FIG. 3B is a diagram illustrating tape speed information of the servo writer according to the first embodiment.

In a general servo writer, in a case where the width of the magnetic tape MT fluctuates, the edge of the magnetic tape MT has contact with the flange of the guide roller, and there is a possibility that this contact secondarily causes natural vibration with a short period (refer to FIG. 3A). On the other hand, in the servo writer 10 according to the first embodiment, even in a case where the width of the magnetic tape MT fluctuates, the edge of the magnetic tape MT does not have contact with the flange. Therefore, it is possible to prevent that the natural vibration with a short period as described above secondarily occurs (refer to FIG. 3B). Note that FIGS. 3A and 3B illustrate speed information of the magnetic tape MT before conversion to a position error signal (PES), and the above information is obtained by reading servo patterns A and B and servo patterns C and D having trapezoidal shapes illustrated in FIG. 4 from the magnetic tape MT.

Furthermore, the guide rollers 15A and 15B are provided in the travel path between the capstan 13A and the pinch roller 13B and the servo signal writing head 17, and the guide rollers 16A and 16B are provided in the travel path between the capstan 14A and the pinch roller 14B and the servo signal writing head 17. As a result, on both sides of the servo signal writing head 17, it is possible to stabilize the travel of the magnetic tape MT.

[Modification]

Figure 5:
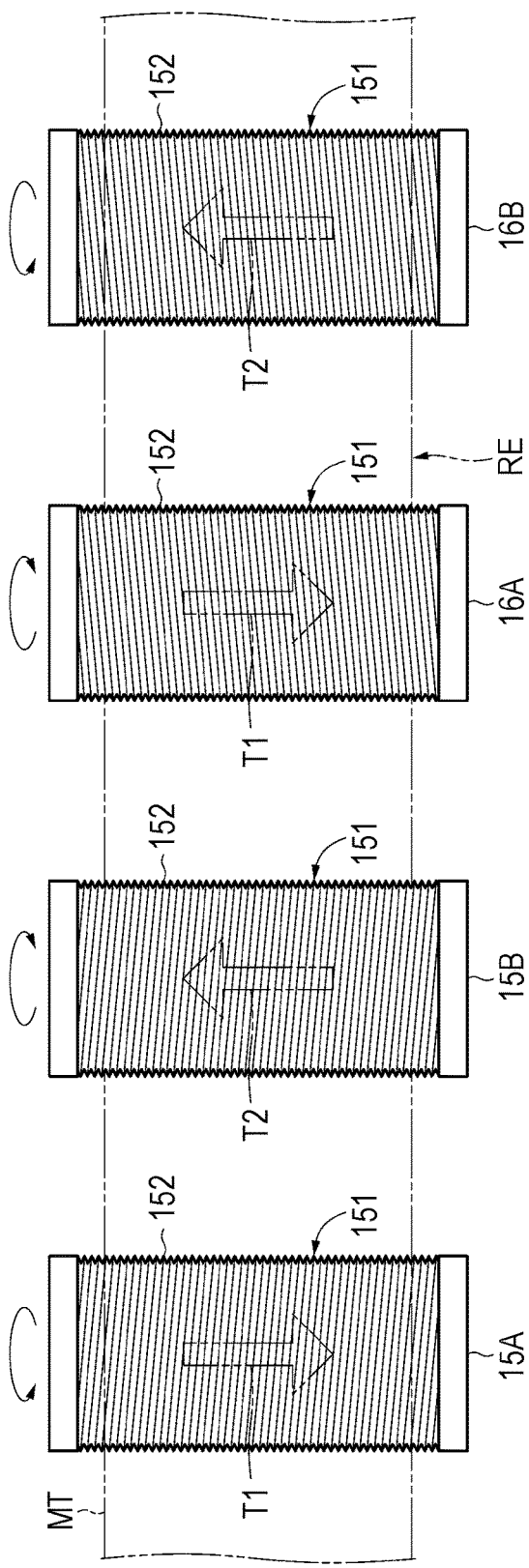
FIG. 5A is a plan view illustrating the configuration of the guide roller.
FIG. 5B is a perspective view illustrating the direction of the tensile force that acts on the traveling magnetic tape from the guide roller.

As illustrated in FIGS. 5A and 5B, a winding direction of the groove 152 provided on the peripheral surfaces of the guide rollers 15A and 15B provided in the travel path on the upstream side of the servo signal writing head 17 may be opposite to a winding direction of a groove 152 provided on peripheral surfaces of guide rollers 16C and 16D provided in the travel path on the upstream side of the servo signal writing head 17. Here, the winding direction of the groove 152 means the winding direction of the groove 152 when viewed from one end of each of the guide rollers 15A, 15B, 16A, and 16B.

The number of guide rollers (hereinafter, may be referred to as "first guide roller") provided in the travel path between the capstan 13A and the pinch roller 13B and the servo signal writing head 17 is not particularly limited and may be one or equal to or more than three. Furthermore, the number of guide rollers (hereinafter, may be referred to as "second guide roller") provided in the travel path between the capstan 14A and the pinch roller 14B and the servo signal writing head 17 is not particularly limited and may be one or equal to or more than three.

Figure 6:
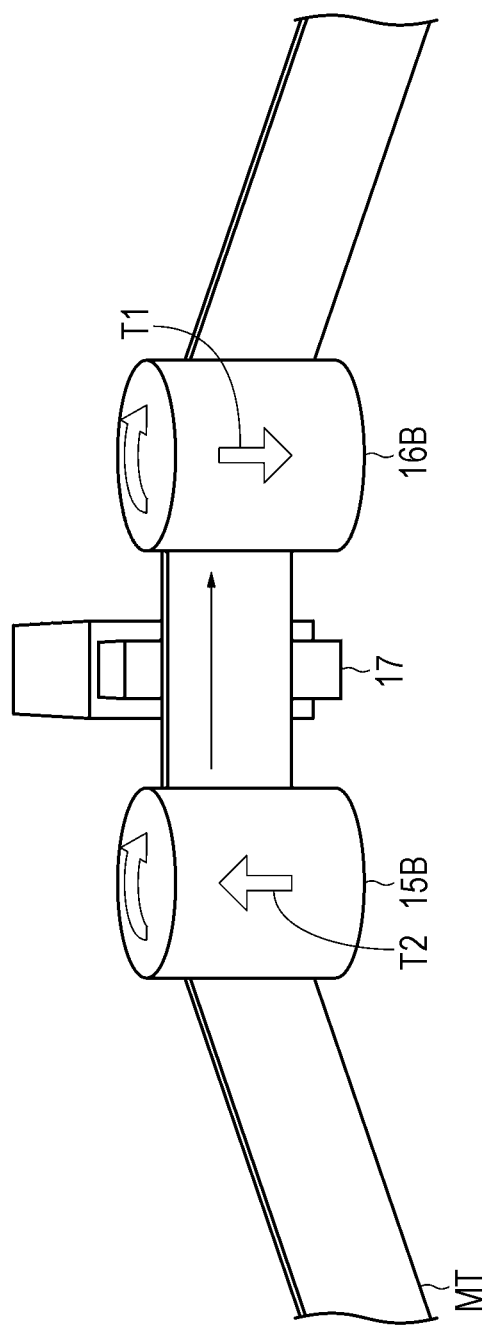
FIG. 6 is a perspective view illustrating the direction of the tensile force that acts on the traveling magnetic tape from the guide roller.

For example, as illustrated in FIG. 6, the single guide roller 15B may be provided in the travel path between the capstan 13A and the pinch roller 13B and the servo signal writing head 17, and the single guide roller 16B may be provided in the travel path between the capstan 14A and the pinch roller 14B and the servo signal writing head 17. In this case, the winding direction of the groove 152 provided on the peripheral surface of the guide roller 15B is opposite to the winding direction of the groove 152 provided on the peripheral surface of the guide roller 16B.

Figure 7:
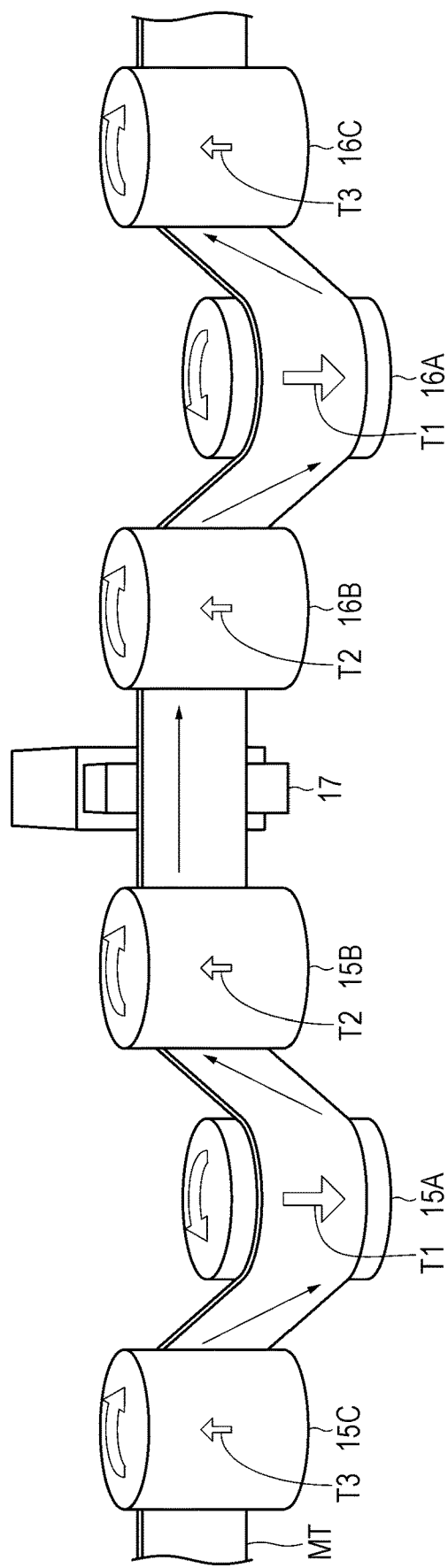
FIG. 7 is a perspective view illustrating the direction of the tensile force that acts on the traveling magnetic tape from the guide roller.

For example, as illustrated in FIG. 7, guide rollers 15A, 15B, and 15C may be provided in the travel path between the capstan 13A and the pinch roller 13B and the servo signal writing head 17, and guide rollers 16A, 16B, and 16C may be provided in the travel path between the capstan 14A and the pinch roller 14B and the servo signal writing head 17. In this case, it is only required that tensile forces T1, T2, and T3 that act on the magnetic tape MT respectively from the guide rollers 15A, 15C, and 15C cancel each other and tensile forces T1, T2, and T3 that act on the magnetic tape MT respectively from the guide rollers 16A, 16C, and 16C cancel each other.

The number of first guide rollers and the number of second guide rollers may be the same or different from each other. However, from the viewpoint of ease of design of the servo writer 10, it is preferable that the numbers be the same.

It is preferable that the number of first guide rollers and the number of second guide rollers be even numbers. By including one or two or more pairs of guide rollers 15A and 15B in the first embodiment as the plurality of first guide rollers, the tensile forces that act on the magnetic tape MT from the plurality of first guide rollers can cancel each other. Similarly, by including one or two or more pairs of guide rollers 16A and 16B in the first embodiment as the plurality of second guide rollers, the tensile forces that act on the magnetic tape MT from the plurality of second guide rollers can cancel each other. Accordingly, the servo writer 10 is easily designed.

In the first embodiment, a case has been described in which the present disclosure is applied to the servo writer. However, the present disclosure may be applied to a recording and reproducing device (magnetic tape device) that records data in the long magnetic tape MT and reproduces the data.

The guide rollers 15A, 15B, 16A, and 16B may have the flanges on both ends. However, from the viewpoint of improving the writing accuracy of the servo signal, it is preferable that the guide rollers 15A, 15B, 16A, and 16B be flangeless guides.

The sizes of the guide rollers 15A and 15B may be the same or different. In a case where the sizes of the guide rollers 15A and 15B are different from each other, by adjusting the winding width of the magnetic tape MT or an angle, a width, or the like of the groove 152, the magnitudes of the tensile forces T1 and T2 can be equal to each other or can be substantially equal to each other.

The magnetic tape MT may be a coating-type magnetic tape on which an underlayer, a recording layer, or the like are produced by a coating process (wet process) or a thin-film magnetic tape of which an underlayer, a recording layer, or the like are produced by a vacuum thin film producing technology (dry process) such as sputtering. Furthermore, the magnetic tape MT may be a vertical recording magnetic tape or a horizontal recording magnetic tape.

2 Second Embodiment

[Configuration of Servo Writer]

Figure 8:
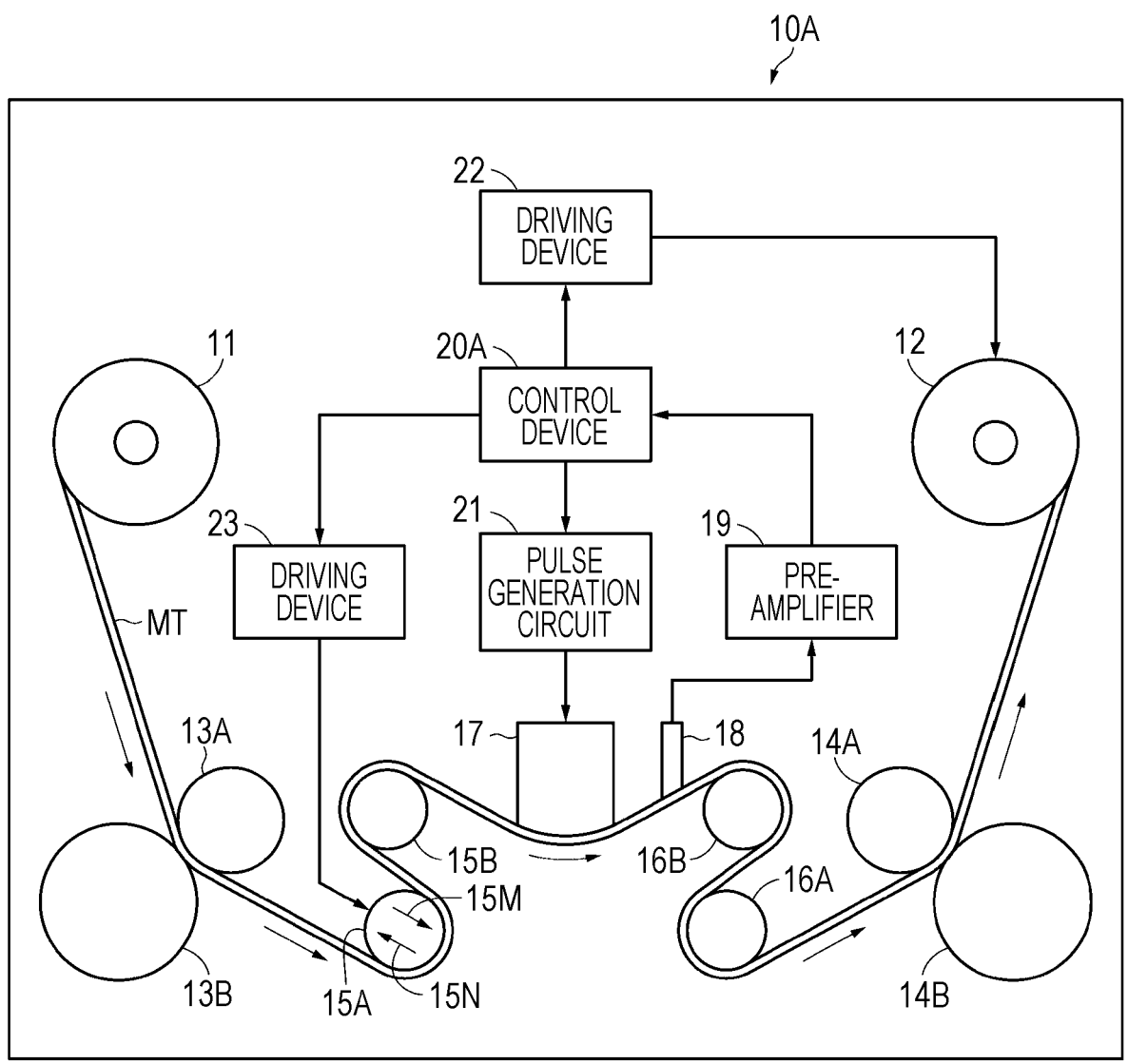
FIG. 8 is a schematic diagram illustrating a configuration of a servo writer according to a second embodiment.

As illustrated in FIG. 8, a servo writer 10A according to a second embodiment is different from the servo writer 10 according to the first embodiment in that a control device 20A is included instead of the control device 20 and a driving device 23 is further included. Note that components in the second embodiment similar to those in the first embodiment are denoted with the same reference numerals, and description thereof will be omitted.

(Control Device)

Figure 4:
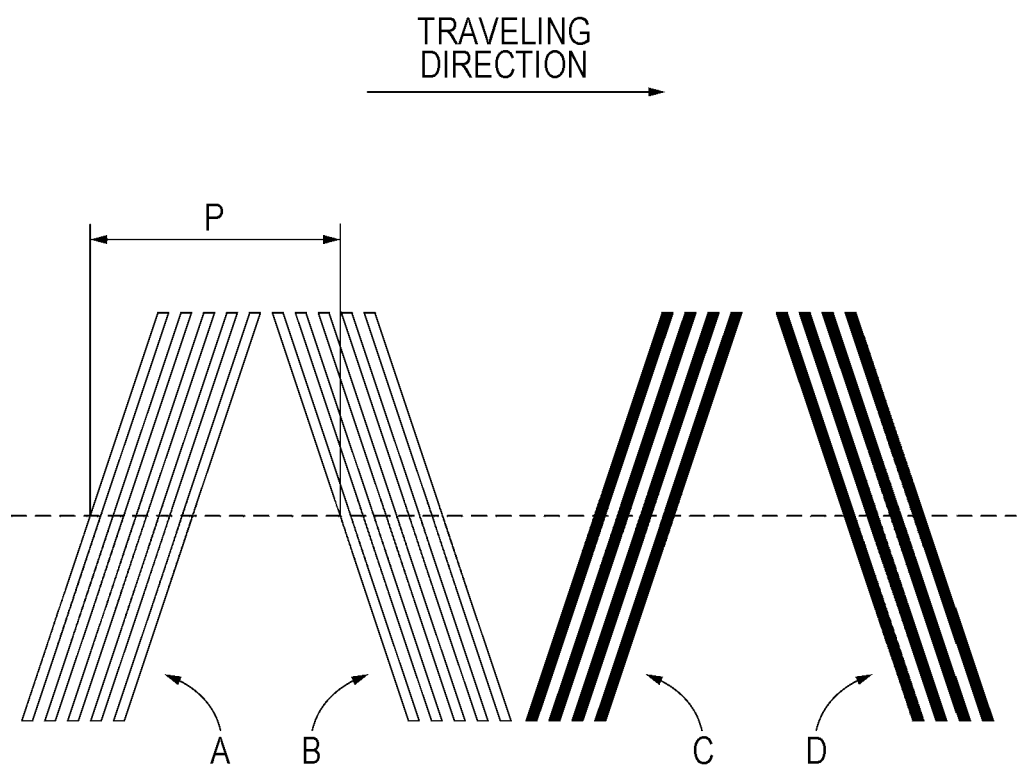
FIG. 4 is a schematic diagram illustrating a servo pattern written on the magnetic tape.

The control device 20A controls the driving device 23 on the basis of a servo signal supplied from a servo signal reading head 18 via a pre-amplifier 19. Specifically, servo patterns A and B having trapezoidal shapes are recorded on a magnetic tape MT as servo signals as illustrated in FIG. 4, and the control device 20A determines whether or not writing positions of the servo patterns A and B (servo signal) are deviated from a specified range on the basis of the servo signals obtained by reading the servo patterns A and B. Here, the "specified range" means a specified servo signal recording position range with reference to a tape reference edge RE.

A distance P between the servo patterns A and B varies depending on a position in the width direction of the magnetic tape MT. Therefore, the control device 20A can determine whether or not the writing positions of the servo patterns A and B (servo signal) are deviated from the specified range as described above on the basis of an interval of pulse signals corresponding to the servo patterns A and B (for example, on the basis of whether or not the interval between pulse signals is within specified range). Other points of the control device 20A are similar to those of the control device 20 according to the first embodiment.

(Driving Device)

The driving device 23 moves a guide roller 15A in a direction perpendicular to a rotation axis of the guide roller 15A (directions indicated by arrows 15M and 15N in FIG. 8) on the basis of control by the control device 20A and adjusts the winding width of the magnetic tape MT around the guide roller 15A. Here, the winding width means a winding width of the magnetic tape MT in a longitudinal direction of the magnetic tape MT.

[Servo Signal Writing Method]

Figure 9:
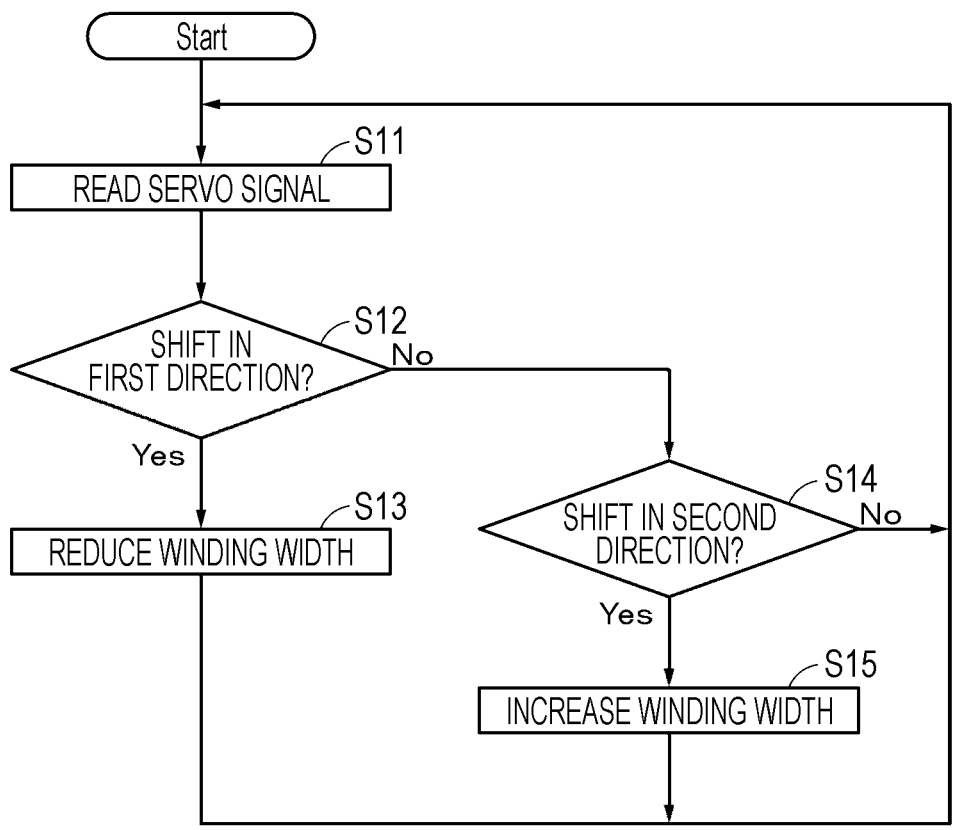
FIG. 9 is a flowchart for explaining a servo signal writing method according to the second embodiment.

Hereinafter, a servo signal writing method by using the servo writer 10A will be described with reference to FIG. 9.

First, in step S11, a servo signal reading head 18 reads a servo signal on the traveling magnetic tape MT and supplies the read signal to the control device 20A via the pre-amplifier 19. Next, in step S12, the control device 20A determines whether or not a writing position of the servo signal is deviated from the specified range in a first direction D1 (refer to FIGS. 2A and 2B) on the basis of the servo signal supplied from the servo signal reading head 18 via the pre-amplifier 19. Here, the "first direction D1" means a direction of a tensile force T1 that acts on the magnetic tape MT from the guide roller 15A at the time when the magnetic tape MT travels (first width direction of magnetic tape MT).

In a case where it is determined in step S12 that the writing position of the servo signal is deviated from the specified range in the first direction D1, in step S13, the control device 20A drives the driving device 23 and moves the guide roller 15A in a direction in which the winding amount of the magnetic tape MT around the guide roller 15A is reduced (direction indicated by arrow 15N in FIG. 8). This reduces the tensile force T1 acting on the magnetic tape MT from the guide roller 15A.

On the other hand, in a case where it is determined in step S12 that the writing position of the servo signal is not deviated from the specified range in the first direction D1, in step S14, the control device 20A determines whether or not the writing position of the servo signal is deviated from the specified range in a second direction D2 (refer to FIGS. 2A and 2B) on the basis of the servo signal read by the servo signal reading head 18. Here, the "second direction D2" means a direction opposite to the direction of the tensile force T1 that acts on the magnetic tape MT from the guide roller 15A at the time when the magnetic tape MT travels (second width direction of magnetic tape MT).

In a case where it is determined in step S14 that the writing position of the servo signal is deviated from the specified range in the second direction D2, in step S15, the control device 20A drives the driving device 23 and moves the guide roller 15A in a direction in which the winding amount of the magnetic tape MT around the guide roller 15A is increased (direction indicated by arrow 15M in FIG. 8). This increases the tensile force T1 that acts on the magnetic tape MT from the guide roller 15A. On the other hand, in a case where it is determined in step S14 that the writing position of the servo signal is not deviated from the specified range in the second direction D2, the control device 20A returns the processing to step S11.

[Effect]

The servo writer 10A according to the second embodiment includes the driving device 23 that moves the guide roller 15A and the control device 20A that controls the driving device 23 on the basis of the servo signal read by the servo signal reading head 18 and adjusts the winding width of the magnetic tape MT around the guide roller 15A. With this structure, the traveling position of the magnetic tape MT can be adjusted so that the writing position of the servo signal is within the specified range. Therefore, the servo signal writing accuracy can be further improved.

[Modification]

A configuration may be adopted in which at least one of the winding width of the magnetic tape MT around the guide roller 15A or the winding width of the magnetic tape MT around the guide roller 15B is adjusted. A configuration may be adopted in which at least one of the winding width of the magnetic tape MT around the guide roller 16A or the winding width of the magnetic tape MT around the guide roller 16B is adjusted.

The control device 20A may adjust the winding width of the magnetic tape MT around the guide roller 15A by feedback control so that the writing position of the servo signal is within the specified range.

3 Third Embodiment

Figure 10:
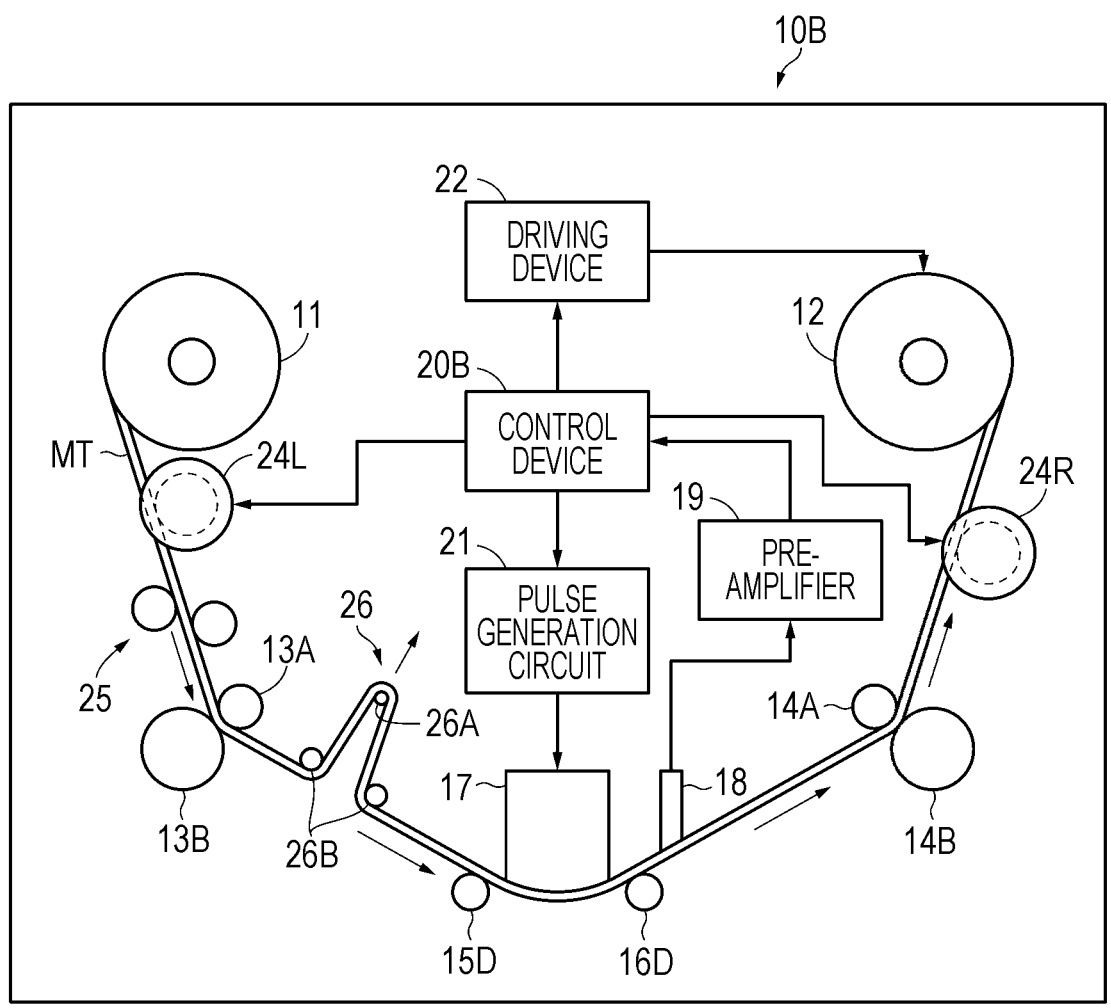
FIG. 10 is a schematic diagram illustrating a configuration of a servo writer according to a third embodiment.

As illustrated in FIG. 10, a servo writer 10B according to a third embodiment includes a delivery reel 11, a winding reel 12, capstans 13A and 14A, pinch rollers 13B and 14B, guide rollers 15D and 16D, a servo signal writing head 17, a servo signal reading head 18, a pre-amplifier 19, a control device 20B, a pulse generation circuit 21, a driving device 22, guide rollers with flange 24L and 24R, a dusting unit 25, and a tension adjusting unit 26. Note that components in the third embodiment similar to those in the first embodiment are denoted with the same reference numerals, and description thereof will be omitted.

(Guide Roller)

The guide roller 15D is provided in a travel path between the capstan 13A and the pinch roller 13B and the servo signal writing head 17. The guide roller 15D is similar to the guide roller 15B in the first embodiment. The guide roller 16D is provided in a travel path between the capstan 14A and the pinch roller 14B and the servo signal writing head 17. The guide roller 16D is similar to the guide roller 15D except that a winding direction of a spiral groove 152 is reversed. Therefore, at the time when the magnetic tape MT travels, a tensile force T2 that acts on the magnetic tape MT from the guide roller 15D and the tensile force T1 that acts on the magnetic tape MT from the guide roller 16D are in directions opposite to each other and cancel each other.

(Guide Roller with Flange)

The guide roller with flange 24L is provided in a travel path between the delivery reel 11 and the capstan 13A and the pinch roller 13B and guides the travel of the magnetic tape MT. The guide roller with flange 24R is provided in a travel path between the winding reel 12 and the capstan 14A and the pinch roller 14B and guides the travel of the magnetic tape MT.

Figure 11:
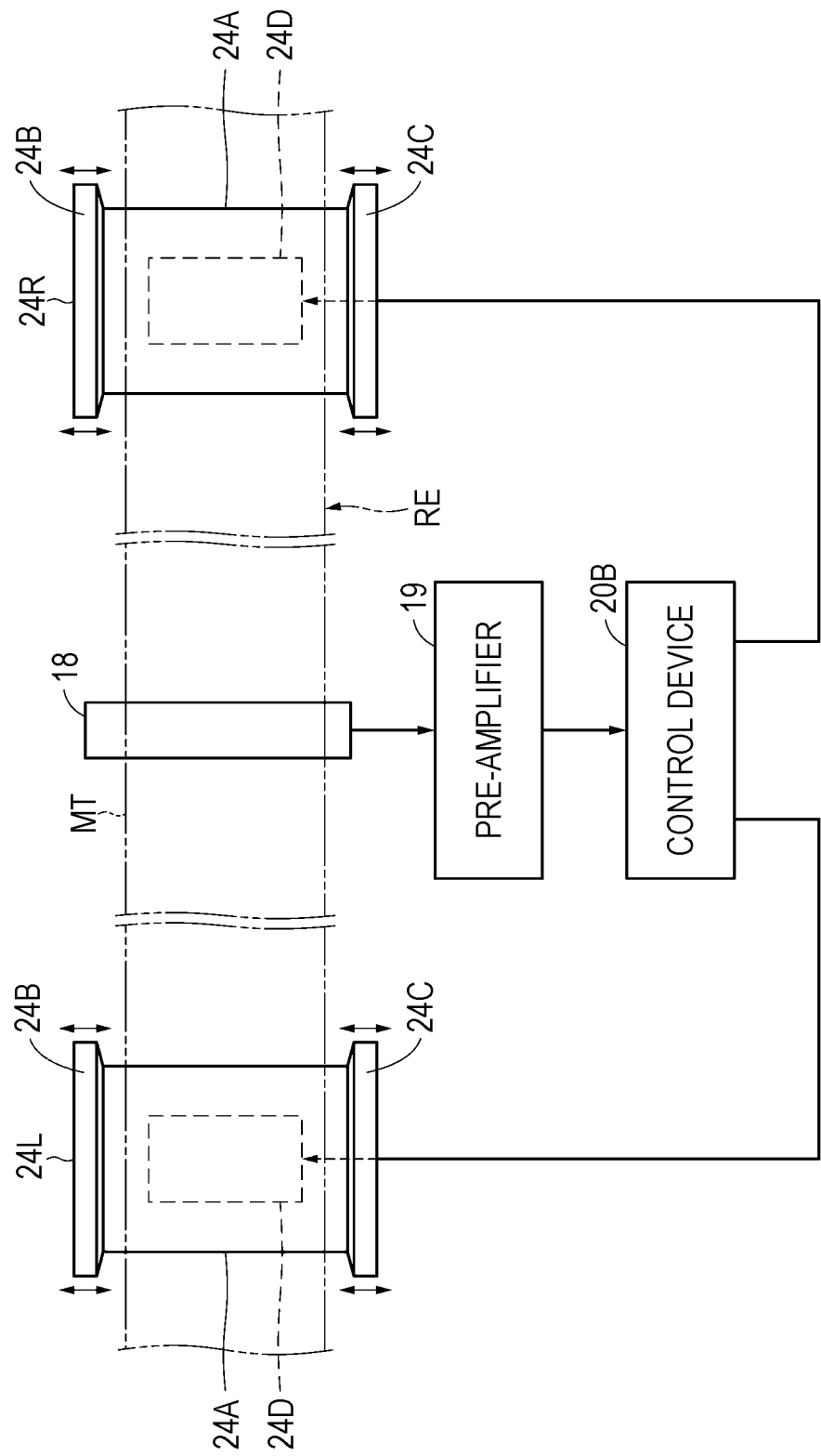
FIG. 11 is a schematic diagram for explaining a configuration and an operation of the guide roller.

As illustrated in FIG. 11, each of the guide rollers with flange 24L and 24R includes a cylindrical roller body 24A that freely rotates around an axis, a pair of flanges 24B and 24C that regulates the position of the traveling magnetic tape MT and is configured to be movable in an axial direction of the roller body 24A, and a driving device 24D that moves both of the pair of flanges 24B and 24C in the axial direction of the roller body 24A.

The flanges 24B and 24C are provided at both ends of the roller body 24A and are projected from the circumferential surface of the roller body 24A. The driving device 24D includes a motor, an actuator, or the like provided in the roller body 24A and drives the motor, the actuator, or the like on the basis of the control by the control device 20B and moves both of the pair of flanges 24B in the axial direction of the roller body 24A.

(Control Device)

As illustrated in FIG. 11, the control device 20B adjusts positions of the flanges 24B and 24C of the respective guide rollers with flange 24L and 24R on the basis of the servo signal supplied from the servo signal reading head 18 via the pre-amplifier 19. Specifically, as illustrated in FIG. 4, the servo patterns A and B having trapezoidal shapes are recorded on the magnetic tape MT as the servo signal, and the control device 20A adjusts the positions of the flanges 24B and 24C of the respective guide rollers with flange 24L and 24R on the basis of the servo signal obtained by reading the servo patterns A and B. Other points of the control device 20B are similar to those of the control device 20 according to the first embodiment.

(Dusting Unit)

The dusting unit 25 is provided in a travel path between the guide roller with flange 24L and the capstan 13A and the pinch roller 13B and removes dusts, dirt, or the like attached to the magnetic tape MT.

(Tension Adjusting Unit)

The tension adjusting unit 26 is a device that applies tension to the magnetic tape MT in the longitudinal direction in order to suppress vibration of the traveling magnetic tape MT and is provided on the upstream side of the travel path with respect to the servo signal writing head 17. More specifically, the tension adjusting unit 26 is provided between the capstan 13A and the pinch roller 13B and the guide roller 15D. However, the tension adjusting unit 26 may be provided on the downstream side of the travel path with respect to the servo signal writing head 17 and may be provided both on the upstream side and downstream side of the travel path with respect to the servo signal writing head 17.

The tension adjusting unit 26 includes a tension arm 26A and a pair of supporting units 26B. The tension arm 26A applies tension on the magnetic tape MT in the longitudinal direction by stretching the traveling magnetic tape MT and appropriately controls winding tension. The tension arm 26A is configured to be movable by being biased by a spring or the like in an arrow direction in FIG. 10. The pair of supporting units 26B supports parts positioned on both sides of the tension arm 26A of the traveling magnetic tape MT.

Note that the configuration of the tension adjusting unit 26 is not limited to this, and may be an air chamber or the like that applies tension to the magnetic tape MT in the longitudinal direction by suctioning air near the traveling magnetic tape MT and suctioning a part of the magnetic tape MT.

[Servo Signal Writing Method]

Figure 12:
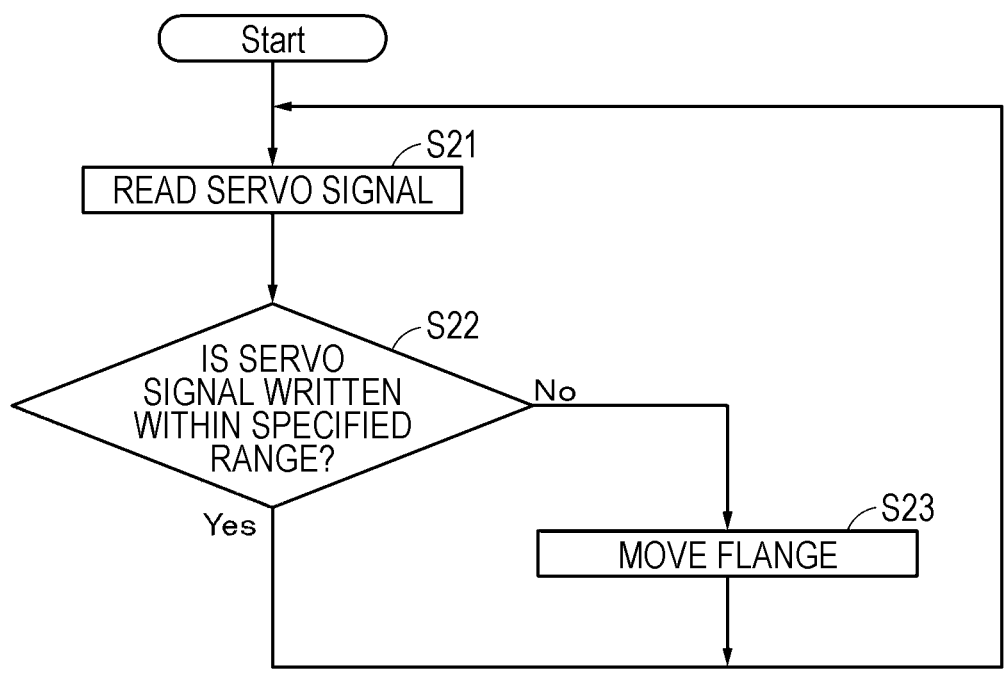
FIG. 12 is a flowchart for explaining a servo signal writing method according to the third embodiment.

Hereinafter, a servo signal writing method by using the servo writer 10B will be described with reference to FIG. 12.

First, in step S21, a servo signal reading head 18 reads a servo signal on the traveling magnetic tape MT and supplies the read signal to the control device 20B via the pre-amplifier 19. Next, in step S22, the control device 20B determines whether or not the servo signal is written within the specified range on the basis of the servo signal supplied from the servo signal reading head 18 via the pre-amplifier 19. Here, the "specified range" means a specified servo signal recording position range with reference to a tape reference edge RE as described in the second embodiment.

In a case where it is determined in step S22 that the servo signal is not written within the specified range, in step S23, the control device 20B moves both of the pair of flanges 24B and 24C provided on both ends of the guide rollers with flange 24L and 24R and makes an interval between the flanges 24B and 24C narrower than a specified position. Here, the specified position means the positions of the flanges 24B and 24C set by the control device 20B as defaults, for example, in a case where the width of the magnetic tape MT is a specified value or within a specified range. On the other hand, in a case where it is determined in step S22 that the servo signal is written within the specified range, the control device 20B returns the processing to step S21.

[Effect]

The servo writer 10B according to the third embodiment includes the guide roller with flange 24L that is provided on the upstream side of the travel path with respect to the capstan 13A and the pinch roller 13B and includes the pair of flanges 24B and 24C that regulates the position of the traveling magnetic tape MT, the guide roller with flange 24R that is provided on the downstream side of the travel path with respect to the capstan 14A and the pinch roller 14B and includes the pair of flanges 24B and 24C that regulates the position of the traveling magnetic tape MT, and the control device 20B that adjusts the distance between the pair of flanges 24B and 24C of the guide rollers with flange 24L and 24R on the basis of the servo signal read by the servo signal reading head 18. With this structure, even in a case where the width of the magnetic tape MT is narrow within the tolerance, insufficient position regulation by the flanges 24B and 24C can be prevented. That is, it is possible to prevent the writing position of the servo signal from being deviated from the regulation.

The servo writer 10A according to the third embodiment includes the guide rollers 15D and 16D, which do not include the flanges, on the downstream side of the travel path with respect to the guide roller with flange 24L. With this structure, the vibration caused by having contact with the flanges 24B and 24C of the guide roller with flange 24L can be suppressed by the guide rollers 15D and 16D.

[Modification]

The servo writer 10B may include a plurality of guide rollers, which does not have a flange, in the travel path between the capstan 13A and the pinch roller 13B and the servo signal writing head 17. As the plurality of guide rollers, the guide roller in the first embodiment or the modification is used. In a case where the above configuration is adopted, the vibration caused by having contact with the flanges 24B and 24C of the guide roller with flange 24L can be suppressed by the plurality of guide rollers in a stepwise manner.

The driving device 24D may move one of the pair of flanges 24B and 24C in the axial directions of the guide rollers with flange 24L and 24R on the basis of the control by the control device 20B and may adjust a distance between the pair of flanges 24B and 24C.

The servo writer 10B may include any one of the guide rollers with flange 24L or 24.

The control device 20B may adjust the distance between the pair of flanges 24B and 24C by feedback control and regulate the traveling position of the magnetic tape MT.

The first to third embodiments and the modification have been specifically described above. However, the present disclosure is not limited to the first to third embodiments and the modifications and can be variously modified on the basis of the technical idea of the present disclosure.

For example, the configurations, the methods, the processes, the shapes, or the like in the first to third embodiments and the modifications are merely examples, and a configuration, a method, a process, a shape, or the like different from those may be used as necessary.

Furthermore, the configurations, the methods, the processes, the shapes, or the like in the first to third embodiments and the modifications can be combined with each other without departing from the spirit of the present disclosure.

Furthermore, the present disclosure can adopt the following configuration.

(1)

A servo writer including:

a writing head configured to write a servo signal on a long magnetic tape that is traveling; and at least two first guide rollers configured to guide the travel of the magnetic tape, in which the at least two first guide rollers on which a spiral groove is provided have a circumferential surface that has contact with the traveling magnetic tape, tensile forces act on the magnetic tape from the at least two first guide rollers in a width direction of the traveling magnetic tape, and the tensile forces that act on the magnetic tape from the at least two first guide rollers cancel each other.

(2)

The servo writer according to (1), in which the at least two first guide rollers include flangeless guide rollers.

(3)

The servo writer according to (1) or (2), including:

a first capstan and a first pinch roller provided on an upstream side of a travel path with respect to the writing head; and a second capstan and a second pinch roller provided on a downstream side of the travel path with respect to the writing head, in which the at least two first guide rollers are provided in a travel path between the first capstan and the first pinch roller and the writing head.

(4)

The servo writer according to (3), further including:

at least two second guide rollers configured to guide the travel of the magnetic tape, in which the at least two second guide rollers are provided in a travel path between the second capstan and the second pinch roller and the writing head, tensile forces act on the magnetic tape from the at least two second guide rollers in the width direction of the traveling magnetic tape, and the tensile forces that act on the magnetic tape from the at least two second guide rollers cancel each other.

(5)

The servo writer according to (4), in which the number of the first guide rollers is the same as the number of the second guide rollers.

(6)

The servo writer according to (4) or (5), in which the number of the first guide rollers and the number of the second guide rollers are even numbers.

(7)

The servo writer according to any one of (1) to (6), in which the at least two first guide rollers include a third guide roller that makes the tensile force act in a first width direction of the traveling magnetic tape, and a fourth guide roller that makes the tensile force act in a second width direction of the traveling magnetic tape.

(8)

The servo writer according to (7), in which a magnitude of the tensile force that acts in the first width direction is equal to or substantially equal to a magnitude of the tensile force that acts in the second width direction.

(9)

The servo writer according to (7) or (8), in which the magnetic tape is wound around the third guide roller and the fourth guide roller so that the magnetic tape has an S-like shape.

(10)

The servo writer according to any one of (1) to (9), further including:

a reading head configured to read the servo signal written on the magnetic tape by the writing head;

a driving unit configured to move at least one of the at least two first guide rollers; and a control unit configured to control the driving unit on the basis of the servo signal read by the reading head and adjust a winding width of the magnetic tape of at least one of the at least two first guide rollers.

(11)

The servo writer according to (1) or (2), further including:

a capstan and a pinch roller provided on an upstream side of a travel path with respect to the writing head;

a guide roller provided on an upstream side of the travel path with respect to the capstan and the pinch roller and including a pair of flanges that regulates a position of the traveling magnetic tape;

a reading head configured to read the servo signal written on the magnetic tape by the writing head; and a control unit configured to adjust a distance between the pair of flanges on the basis of the servo signal read by the reading head.

(12)

A servo signal writing method including:

writing a servo signal on a magnetic tape while guiding the traveling magnetic tape by at least two guide rollers, in which the at least two guide rollers, on which a spiral groove is provided, have a circumferential surface that has contact with the traveling magnetic tape, tensile forces act on the magnetic tape from the at least two guide rollers in a width direction of the traveling magnetic tape, and the tensile forces that act on the magnetic tape from the at least two guide rollers cancel each other.

REFERENCE SIGNS LIST 0, 10A, 10B Servo writer
11 Delivery reel
12 Winding reel
13A, 14A Capstan
13B, 14B Pinch roller
15A, 15B, 15C, 15D, 16A, 16B, 16C, 16D Guide roller
17 Servo signal writing head
18 Servo signal reading head
19 Pre-amplifier
20, 20A, 20B Control device
21 Pulse generation circuit
22, 23, 24D Driving device
24L, 24R Guide roller with flange
24A Roller body
24B, 24C Flange
25 Dusting unit
26 Tension adjusting unit
26A Tension arm
26B Supporting unit
151 Circumferential surface
152 Groove
D1 First direction
D2 Second direction
T1, T2 Tensile force

The invention claimed is:

1. A servo writer comprising:

a writing head configured to write a servo signal on a long magnetic tape that is traveling; and at least two first guide rollers configured to guide the travel of the magnetic tape, wherein the at least two first guide rollers including a third guide roller and a fourth guide roller on which a spiral groove is provided have a circumferential surface that has contact with the traveling magnetic tape, tensile forces act on the magnetic tape from the at least two first guide rollers in a width direction of the traveling magnetic tape, and the tensile forces that act on a same area of the magnetic tape from the at least two first guide rollers cancel each other, and wherein the third guide roller is configured to provide a tensile force in a first direction, and the fourth guide roller is configured to provide a tensile force in a second direction opposite to the first direction and the third and fourth guide rollers are provided on a same side with respect to the writing head.

2. The servo writer according to claim 1, wherein the at least two first guide rollers include flangeless guide rollers.

3. The servo writer according to claim 1, further comprising:

a first capstan and a first pinch roller provided on an upstream side of a travel path with respect to the writing head; and a second capstan and a second pinch roller provided on a downstream side of the travel path with respect to the writing head, wherein the at least two first guide rollers are provided in a travel path between the first capstan and the first pinch roller and the writing head.

4. The servo writer according to claim 3, further comprising:

at least two second guide rollers configured to guide the travel of the magnetic tape, wherein the at least two second guide rollers are provided in a travel path between the second capstan and the second pinch roller and the writing head, tensile forces act on the magnetic tape from the at least two second guide rollers in the width direction of the traveling magnetic tape, and the tensile forces that act on the magnetic tape from the at least two second guide rollers cancel each other.

5. The servo writer according to claim 4, wherein a number of the at least two first guide rollers is same as a number of the at least two second guide rollers.

6. The servo writer according to claim 4, wherein a number of the at least two first guide rollers and a number of the at least two second guide rollers are even numbers.

7. The servo writer according to claim 1, wherein a magnitude of the tensile force that acts in the first direction is equal to or substantially equal to a magnitude of the tensile force that acts in the second direction.

8. The servo writer according to claim 1, wherein the magnetic tape is wound around the third guide roller and the fourth guide roller so that the magnetic tape has an S-like shape.

9. The servo writer according to claim 1, further comprising:

a reading head configured to read the servo signal written on the magnetic tape by the writing head;

a driving unit configured to move at least one of the at least two first guide rollers; and a control unit configured to control the driving unit on a basis of the servo signal read by the reading head and adjust a winding width of the magnetic tape of at least one of the at least two first guide rollers.

10. The servo writer according to claim 1, further comprising:

a capstan and a pinch roller provided on an upstream side of a travel path with respect to the writing head;

a guide roller provided on an upstream side of the travel path with respect to the capstan and the pinch roller and including a pair of flanges that regulates a position of the traveling magnetic tape;

a reading head configured to read the servo signal written on the magnetic tape by the writing head; and a control unit configured to adjust a distance between the pair of flanges on a basis of the servo signal read by the reading head.

11. A servo signal writing method comprising:

writing a servo signal on a magnetic tape while guiding the traveling magnetic tape by at least two guide rollers, wherein the at least two guide rollers including a third guide roller and fourth guide roller on which a spiral groove is provided have a circumferential surface that has contact with the traveling magnetic tape, tensile forces act on the magnetic tape from the at least two guide rollers in a width direction of the traveling magnetic tape, and the tensile forces that act on a same area of the magnetic tape from the at least two guide rollers cancel each other, and wherein the third guide roller is configured to provide a tensile force in a first direction, and the fourth guide roller is configured to provide a tensile force in a second direction opposite to the first direction and the third and fourth guide rollers are provided on the same side with respect to the writing head.

* * * * *